(12) United States Patent
Gouge

(10) Patent No.: US 12,479,349 B2
(45) Date of Patent: Nov. 25, 2025

(54) MULTIDECK TRAILER

(71) Applicant: Jeremiah Gouge, Garner, IA (US)

(72) Inventor: Jeremiah Gouge, Garner, IA (US)

(73) Assignee: Jeremiah Gouge, Garner, IA (US)

( * ) Notice: Subject to any disclaimer, the term of this patent is extended or adjusted under 35 U.S.C. 154(b) by 699 days.

(21) Appl. No.: 17/859,388

(22) Filed: Jul. 7, 2022

(65) Prior Publication Data

US 2023/0018310 A1   Jan. 19, 2023

Related U.S. Application Data

(60) Provisional application No. 63/219,012, filed on Jul. 7, 2021.

(51) Int. Cl.
*B60P 3/07* (2006.01)
*B60P 3/077* (2006.01)
*B60P 3/08* (2006.01)

(52) U.S. Cl.
CPC ..................................... *B60P 3/08* (2013.01)

(58) Field of Classification Search
CPC .... B60P 3/08; B60P 3/07; B60P 3/077; B62D 53/062
See application file for complete search history.

(56) References Cited

U.S. PATENT DOCUMENTS

| | | | | |
|---|---|---|---|---|
| 5,110,242 A | * | 5/1992 | Chance | B60P 3/073 410/12 |
| 5,924,754 A | * | 7/1999 | Kuhns | B62D 53/067 296/184.1 |
| 2004/0062620 A1 | * | 4/2004 | Deets | B62D 33/0612 410/4 |

FOREIGN PATENT DOCUMENTS

| | | |
|---|---|---|
| AU | 2011224095 B2 | 4/2012 |
| AU | 2017203803 A1 | 12/2017 |
| CN | 201380884 Y | 1/2010 |
| CN | 206265189 U | 6/2017 |
| CN | 110562325 A | 12/2019 |
| CN | 211054867 U | 7/2020 |
| CN | 111645767 A | 9/2020 |
| EP | 3240722 A1 | 11/2017 |

(Continued)

OTHER PUBLICATIONS

Montracon Ltd; The Montracon MT45; Youtube.com video: https://www.youtube.com/watch?v=R_ATtudQSHo; accessed Mar. 12, 2025, published Oct. 19, 2018. (Year: 2018).*

(Continued)

*Primary Examiner* — Daniel J Colilla
(74) *Attorney, Agent, or Firm* — David M. Breiner; BrownWinick Law Firm

(57) ABSTRACT

Disclosed is an example of a multideck trailer. In at least one nonlimiting example embodiment the multideck trailer has a first deck having an inclined surface and a substantially horizontal surface extending from the inclined surface. In this nonlimiting example embodiment the multideck trailer further includes a first pan arranged at a first side of the first deck and a second pan arranged at a second side of the first deck, the first and second pans being configured to receive wheels of a vehicle. In example embodiments the multideck trailer further includes a second deck attached to the first deck, the second deck having a substantially horizontal top surface. In addition, the multideck trailer includes a ramp pivotally supported.

5 Claims, 3 Drawing Sheets

(56) References Cited

FOREIGN PATENT DOCUMENTS

WO     WO-2016108788 A1 *   7/2016   .............. B60P 1/43

OTHER PUBLICATIONS

Load King by Custom Truck; Lowboy Trailer Walkaround—Load Kin 503-554-SS-SF-18in LDH Hydraulic Detachable Gooseneck Trailer; Youtube.com video; https://www.youtube.com/watch?v=uJyStdzlejU; accessed Mar. 12, 2025; published Sep. 22, 2020. (Year: 2020).*
Broshius Holland—Trailer Specifications / 3-Axle Self-Tracking Semi Low Loader with Ramps—Holland.
Truck Locator—2021 Kässvigrer 5 Axle Extendable Rear Steer Low Loader 80200GVW—United Kingdom.
Montracon—Machine Carriers—England.
Autoline—New LIDER 2022 Ready in Stock 50 Tons Capacity Lowbed low bed semi-trailer—Turkey.
Global Trading Group—Ozsan Trailer Truck Carrier—United Kingdom.
Tata International DLT—Axle TR8 Car Carrier—India.
Schwarzmuller—3-axle Low-Loader Semitrailer with Offset Platform—Reinforced—Austria.
McCauley Trailers—2 Axle Stepframe Low Loader—Northern Ireland.
Tata International DLT—Axle Tractor Trailer—India.
John Hudson Trailers—for Sale—United Kingdom.
McCauley Trailers—Northern Ireland.
Autoline—Faymonville Car Transporter Semi-trailer—Denmark.
Autoline—Goldhofer Goldhofer STU 2-28 / 802 car transporter semi-trailer—Poland.
RAC Export Trading—PM3ED (3 Steered Axles Extensible Lowbed Semi-Trailers)—Germany.
RAC Export Trading—PM7 (7 Axles Low Bed Semi-Trailer)—Germany.
Flatbed Truck Services—Flatbed Trailer Styles From Step-Decks to Double Drops—US.
Custom Truck One Source—2021 Load King 503/655 SS SFF Trailer—US.
Semi-trailer ChMZAP 93371 according to specification 033-01 DPK—Russia.
Semi-trailer ChMZAP 93371 according to specification 035—Russia.
Fruehauf Trailer Corporation—Fond Porte Engins—US.
Mytee Products—How to Make Auto Hauling an Easier Task to Do—Jul. 7, 2016—US.
WSI Models—Semi lowloader 4 axle—Netherlands.
Yarkamp—Russia.
Linetrailers—Netherlands.
Piako Transport Engineering Ltd—New Zealand.

* cited by examiner

MULTIDECK TRAILER

CROSS-REFERENCE TO RELATED APPLICATIONS

This application claims the benefit of U.S. Provisional Patent Application No. 63/219,012 titled MULTIDECK TRAILER which was filed with the United States Patent and Trademark Office on Jul. 7, 2021, the entire contents of which are herein incorporated by reference.

BACKGROUND

1. Field

Example embodiments relate to a trailer

2. Description of the Related Art

Tractor trailers are commonly used to transport all sorts of materials around the country. Some trailers are designed to have a first deck and a second deck having an elevation lower than the first deck. In these trailers the first deck is elevated to allow the trailer to connect to a fifth wheel of a tractor and accommodate the back wheels of the trailer. However, most conventional trailers do not have a design allowing vehicles to be efficiently transported thereon. This is because when a vehicle is attempted to be stored on a multideck trailer the vehicles often bottom out at the intersection between the first deck and the second deck. In addition, the vehicles are often rotated so that a top of the vehicle is so high it become problematic when travelling under a low overpass.

SUMMARY

Disclosed is an example of a multideck trailer. In at least one nonlimiting example embodiment the multideck trailer has a first deck having an inclined surface and a substantially horizontal surface extending from the inclined surface. The inclined surface extends a length of about 59 inches and at an angle of about 4 to 5 degrees from the horizontal and the substantially horizontal surface extends about 58 inches, the substantially horizontal surface being about fifty one inches above a ground surface. In this nonlimiting example embodiment the multideck trailer further includes a first pan arranged at a first side of the first deck and a second pan arranged at a second side of the first deck, the first and second pans being configured to receive wheels of a vehicle. In this example, a bottom elevation of the first and second pans is about 45.5 inches from the ground surface. In example embodiments the multideck trailer further includes a second deck attached to the first deck, the second deck having a substantially horizontal top surface about thirty-six inches above the ground. In addition, the multideck trailer includes a ramp pivotally supported, wherein the pivot support is about 45.5 above the ground surface.

BRIEF DESCRIPTION OF THE DRAWINGS

Example embodiments are described in detail below with reference to the attached drawing figures, wherein.

DETAILED DESCRIPTION

Figure 1:
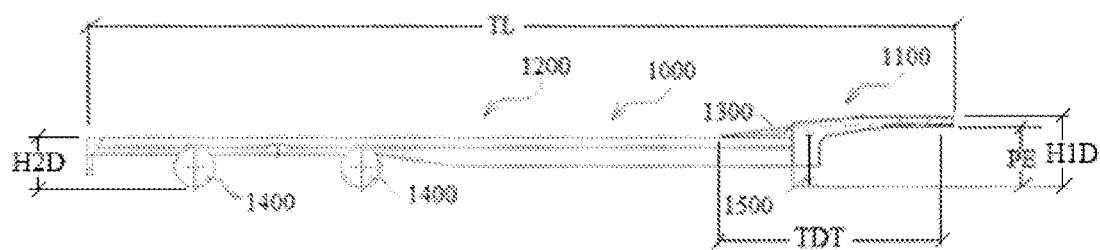
FIG. 1 is a side view of a trailer in accordance with example embodiments.

Example embodiments will now be described more fully with reference to the accompanying drawings. Example embodiments are not intended to limit the disclosure since the disclosure may be embodied in different forms. Rather, example embodiments are provided so that this disclosure will be thorough and complete, and will fully convey the scope of the disclosure to those skilled in the art. In the drawings, the sizes of components may be exaggerated for clarity.

In this application, when a first element is described as being "on" or "connected to" a second element, the first element may be directly on or directly connected to the second element or may be on or connected to an intervening element that may be present between the first element and the second element. When a first element is described as being "directly on" or "directly connected to" a second element, there are no intervening elements. In this application, the term "and/or" includes any and all combinations of one or more of the associated listed items.

In this application, spatially relative terms merely describe one element's relationship to another. The spatially relative terms are intended to encompass different orientations of the structure. For example, if a first element of a structure is described as being "above" a second element, the term "above" is not meant to limit the disclosure since, if the structure is turned over, the first element would be "beneath" the second element. As such, use of the term "above" is intended to encompass the terms "above" and "below". The structure may be otherwise oriented (rotated 90 degrees or at other orientations) and the spatially relative descriptors used herein interpreted accordingly.

Example embodiments are illustrated by way of ideal schematic views. However, example embodiments are not intended to be limited by the ideal schematic views since example embodiments may be modified in accordance with manufacturing technologies and/or tolerances.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Example embodiments relate to a trailer.

Figure 2:
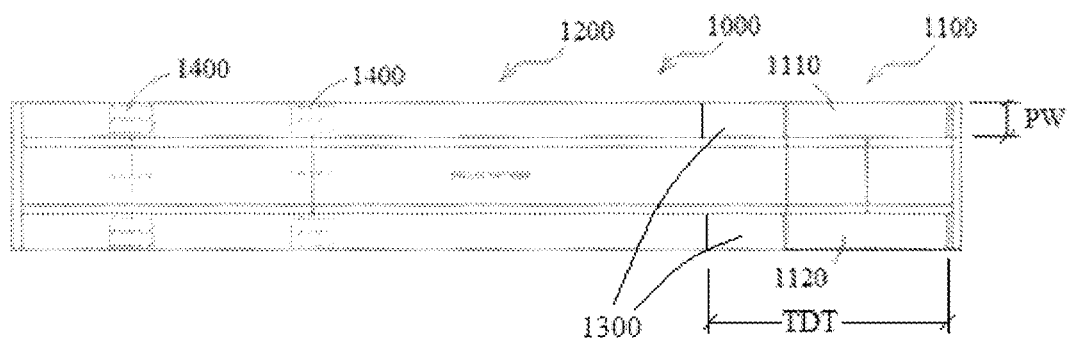
FIG. 2 is a top view of a trailer in accordance with example embodiments.

FIGS. 1 and 2 illustrate a side view and a top view of a trailer 1000 in accordance with an example embodiment. As shown in FIGS. 1 and 2, the trailer 1000 has a first deck 1100 at a first elevation and a second deck 1200 at a second elevation. At the interface between the first deck 1100 and the second deck 1200 is at least one ramp 1300 which may allow a vehicle, for example, a van, to drive upwards so that front wheels of the vehicle can rest in pans 1110 and 1120 on the first deck 1100. In example embodiments, the pans 1110 and 1120 are arranged at the sides of the first deck 1100 and are spaced apart to receive the front wheels of the van (or some other vehicle). Further, the width of the pans PW may be sufficient to allow the wheels to reside therein. For example, the width of the pans PW may be about 23.5 inches or some other suitable width to accommodate tires. For example, the width of the pans PW may be between 10 inches and 24 inches depending on the type of tire expected to be received in the pans 1110 and 1120.

As one skilled in the art would readily appreciate, the trailer 1000 may additionally include wheels 1400 near a first end of the trailer 1000 and a jack 1500 near a second end of the trailer. Though not shown in the figures, the first deck 1100 may include a kingpin allowing the first deck 1100 to couple to a tractor/trailer's fifth wheel. In one particularly useful nonlimiting example embodiment, a height H2D of the second deck 1200 may be about thirty-six inches above the ground whereas a height H1D of the first deck may be about fifty one inches above the ground. Of course, these dimensions are only for the purpose of illustration and are not meant to limit the invention as the heights may be higher or lower. In a nonlimiting example embodiment, a distance PE from the ground to an underside of the pans 1110 and 1120 may be about 45.5 inches. For example, the distance PE may be from 40 inches to 50 inches. The elevational placement of the pans 1110 and 1120 is important in order to prevent a height from a towed vehicle from exceeding a critical height, for example, thirteen feet and six inches as measured from the ground. Of course, the invention is not limited to trailer having pan elevations of 45.5 inches since the elevation could vary and may actually have an elevation a few inches higher or lower than 45.5 inches.

Figure 3A:
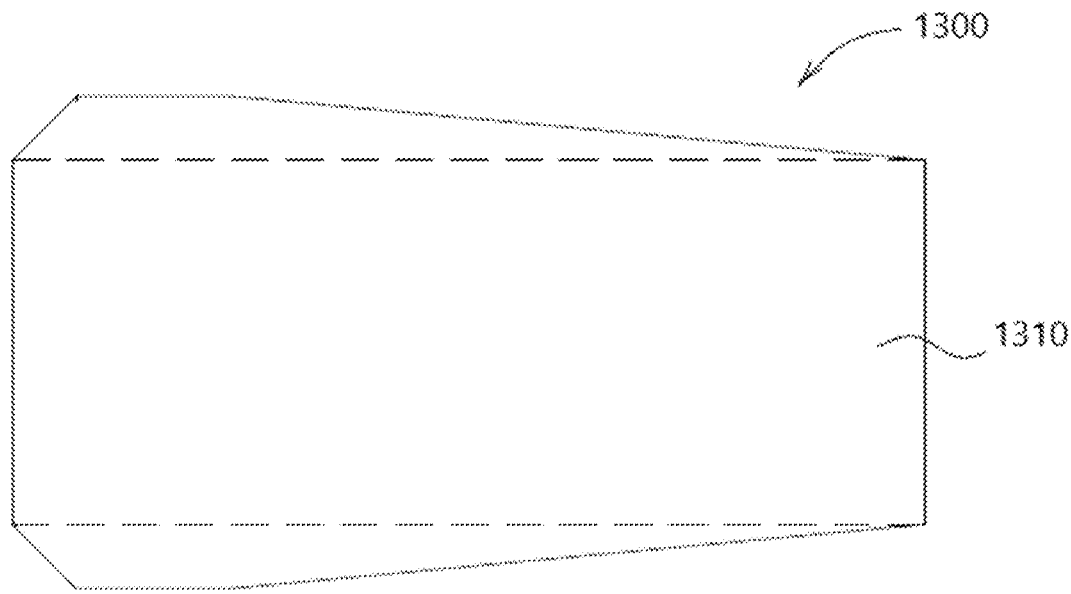
FIGS. 3A-3C are views associated with a ramp in accordance with example embodiments.
Figure 3B:
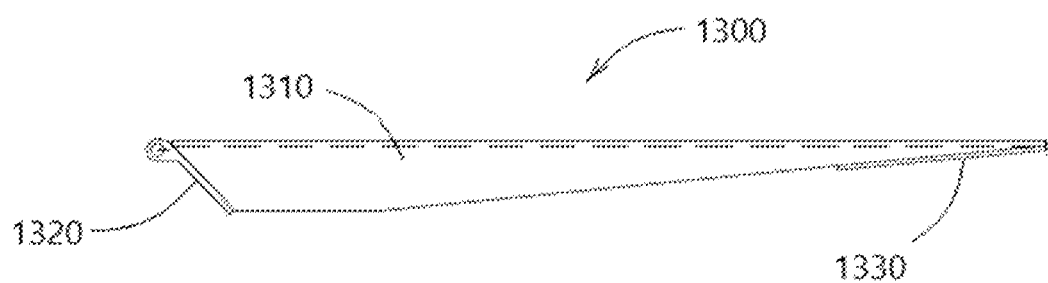
Figure 3C:
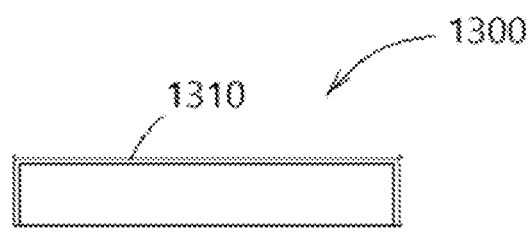

FIGS. 3A-3C illustrate an example of how the ramp 1300 may be constructed. FIG. 3A, for example, shows a generally flat plate with fold lines. In the embodiment of FIG. 3A, the flat pate is made from aluminum but may be made other materials such as steel or a hard plastic. Regardless, the plate of FIG. 3A may be folded to form a body 1310 of the ramp 1300. An eye 1320 may be welded to the body 1310 so the body 1310 may be pivotally supported on the trailer 1000. In addition, a bushing plate 1330 may be welded to the body 1310 to add strength and rigidity to the body 1310. Referring back to FIG. 2, when the ramp 1300 is in a position of use, as shown in FIG. 1, the travel of a vehicle TDT from the left end of the ramp 1300 to the right end of a pan 1110 and 1120 may be about 156 inches.

Figure 4:
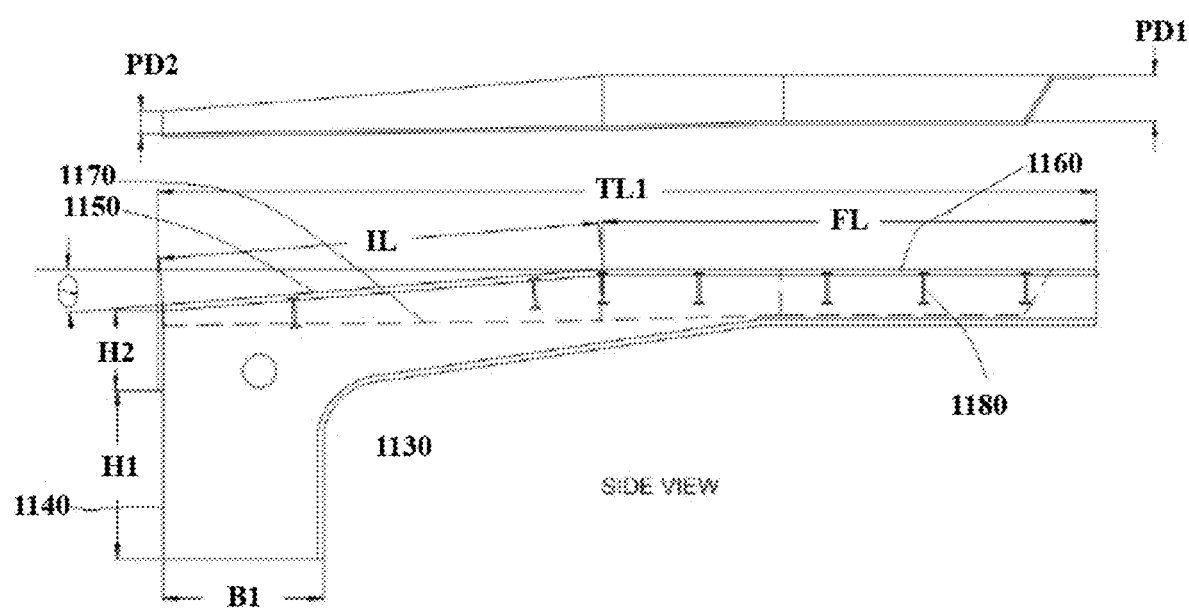
FIG. 4 is a view of first deck in accordance with example embodiments.

FIG. 4 is a side view of the first deck 1100. As shown in FIG. 4, the first deck 1100 may have a somewhat concave portion 1130 to accommodate the wheels of a semitruck. Though not shown in the figures, it is understood this portion may also include a kingpin which may engage a fifth wheel of the semitruck. A left end 1140 of the first deck 1100 may connect to the second deck 1200. A distance H1 from the bottom of the first deck 1100 to a top of the second deck 1200 may be about 20.5 inches. A second height H2, above the first height H1 may be about 10 inches and may serve as a connection point of the ramp 1300. That is, the left end 1140 may have a portion extending above a top surface of the second deck 1200 and may have structuring allowing the ramp 1300 to pivotally attach thereto. Extending from the left end 1140 is an inclined surface 1150 which may be inclined from the horizontal at an angle Θ (which may be about 4 to about 5 but could also, on some embodiments, be up to 20 degrees) and may extend to a top surface 1160 which may extend substantially horizontally. The length IL of the inclined section may be, but is not required to be, about 59 inches. As such, the length IL may be between 47 inches to 71 inches. The length FL of the top surface 1160 may be, but is not required to be, about 58 inches. As such, the length FL may be 46 inches to 70 inches. When combined, a total length TL1 of the first deck 1100 may be about 117 inches, but could be longer or shorter. At the sides of the first deck 1100 are pans 1110 and 1120 which may receive wheels of a vehicle. Bottom surfaces 1170 of the pans 1110 and 1120 may be substantially horizontal and may extend an entire length of the first deck 1100 (or nearly an entire length of the first deck 1100). At one end of the pans 1110 and 1120 a depth PD1 of the pan may be about 5.75 inches while at the other end of the pan 1110 and 1120 the depth may be 2.75 inches. As such, a profile of the pans 1110 and 1120 may match the inclined and top surfaces 1150 and 1160. Further, a top elevation of the ramp 1300 may be about the same as the bottom elevation of the pans 1110 and 1120 so that a wheeled vehicle may easily transition from the ramp 1130 onto the pans 1110 and 1120 of the first deck 1100. When in position, a vehicle may have a front end tires in the pans 1110 and 1120 and back end tires on the second deck 1200. This allows a vehicle to be towed at an angle which shortens the overall horizontal dimension of the vehicle while increasing a vertical dimension of the vehicle. However, due to the specialized arrangement of the various elements, a top of the vehicle may be maintained at a height which is below a preset height to eliminate problems of passing under a low overpass. For example, the height of the vehicle (or any hauled unit) may be maintained at a height of less than thirteen feet and six inches.

In example embodiments structural members 1180 may extend between the pans 1110 and 1120 to provide strength and rigidity to the first deck 1100. The structural members 1180 may take on any form including I-beams, H-Beams, W-beams, Channel iron, or any other suitable structural member.

Figure 5:
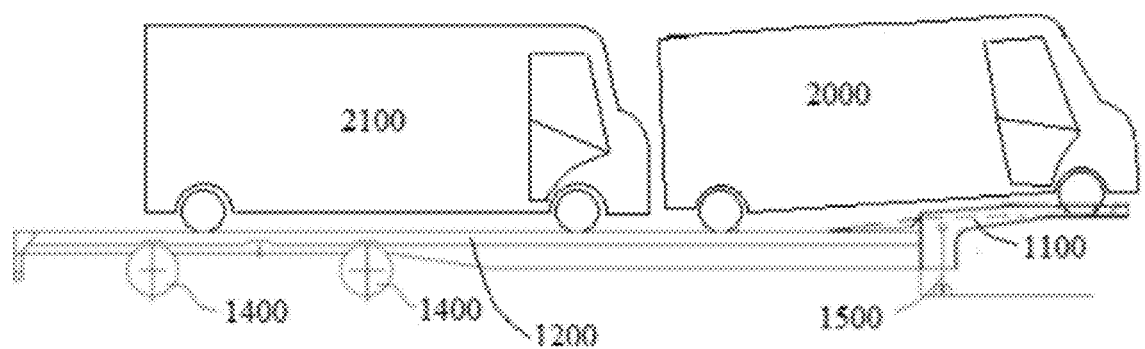
FIG. 5 is a view of a loaded trailer in accordance with example embodiments.

FIG. 5 is an illustration of a prototype trailer implementing the above inventive concepts. In FIG. 5 the trailer 1000 includes the first deck 1100 and the second deck 1200. In FIG. 5, a first vehicle 2000 is shown having its front tires supported in the pans 1110 and 1120 of the first deck and back tires on the second deck 1200. The second deck 1200 is configured with a length so as to support a second vehicle 2100. In this particular nonlimiting example embodiment, the geometry of the first deck 1100, the second deck 1200, and the ramp 1300 allow the first vehicle 2000 to drive onto the first deck 1100 from the second deck 1200 without bottoming out which would happen with prior art trailers. In addition, as shown in FIG. 5, the overall configuration of the first deck 1100, the second deck 1200, and the ramp 1300 allow the first vehicle 2000 to be supported so that its height does not exceed a critical height, for example, 13.5 feet as measured from the ground.

One distinguishing figure associated with the inventor's trailer is a low distance from ground to top deck height. When a vehicle is being transported, the wheel pan area where the front axle of vehicle #1 (front vehicle being transported) is lower than any other trailer that could be found available on the market. This is contingent on the 5th wheel and chassis spec of the truck pulling the trailer has a fifth wheel height of 42 to 43".

Another distinguishing feature is the deck transition. The spot where the top deck transitions to the bottom deck is typically a 90 deg angle. In example embodiments the transition is much less, for example, 4-5 degrees. This area is where a vehicle being transported with a low ground clearance will typically "high center" before the vehicle #1 can be driven far enough ahead to allow room for the second vehicle to be loaded at the rear of the trailer. A key factor is that the inventor's design allows all of this and manages to keep the overall length of two vehicles to under 53'. 53' is the longest payload that can be legally transported with a traditional 5th wheel design. Some auto transporters can haul cargo adding up to more than 53' because they use a "stinger" type of coupling system where the 5th wheel is behind the trucks frame rails as opposed to being on the frame rails as in the inventor's design. This also makes the inventor's design more universal to other types of cargo as weight distribution is much more even and allows weight to transfer to the steer axle and also is adjustable to move weight from the drive axles to the steering axle and vise versa. The "stinger" does not adjust nor does it transfer weight from axle to axle. Thus, the inventor's trailer is clearly an improvement over the prior art.

What I claim is:

1. A multideck trailer comprising:
a first deck having an inclined surface and a substantially horizontal surface extending from the inclined surface, the inclined surface extending a length of about 59 inches and at an angle of about 4 to 5 degrees from the horizontal and the substantially horizontal surface extending about 58 inches, the substantially horizontal surface being about fifty one inches above a ground surface;
a first pan arranged at a first side of the first deck and a second pan arranged at a second side of the first deck, the first and second pans being configured to receive wheels of a vehicle, a bottom elevation of the first and second pans being about 45.5 inches from the ground surface;
a second deck attached to the first deck, the second deck having a substantially horizontal top surface about thirty-six inches above the ground surface; and
a ramp pivotally supported, wherein the pivot support is about 45.5 inches above the ground surface.

2. The multideck trailer, wherein a length of the trailer is about 53 feet.

3. The multideck trailer of claim 1, wherein the top deck travel is about 156 inches.

4. A system comprising:
the multideck trailer of claim 1;
a first vehicle having front wheels in the first and second pans and back wheels on the second deck; and
a second vehicle on the second deck, wherein the height of the first vehicle is less than 13.5 feet from the ground surface.

5. The multideck trailer of claim 1, wherein bottom surfaces of the first pan and second pan extend an entire length of the first deck.

\* \* \* \* \*